United States Patent [19]

Calmettes

[11] Patent Number: 4,543,691
[45] Date of Patent: Oct. 1, 1985

[54] HOSE CLAMP

[75] Inventor: Lionel Calmettes, Ozoir-la-Ferriere, France

[73] Assignee: Establissements Caillau, Boulogne-Billancourt, France

[21] Appl. No.: 564,201

[22] Filed: Dec. 22, 1983

[30] Foreign Application Priority Data

Jan. 13, 1983 [FR] France .................. 83 00441

[51] Int. Cl.⁴ ............................... B65D 63/06
[52] U.S. Cl. .................. 24/20 R; 24/20 EE; 24/20 TT; 24/22; 24/23 W
[58] Field of Search ............ 24/20 R, 20 TT, 20 EE, 24/20 CW, 23 R, 23 EE, 20 SL, 20 S, 30.5 W, 22

[56] References Cited

U.S. PATENT DOCUMENTS

| 157,032 | 11/1874 | Smith | 24/20 EE |
| 356,083 | 1/1887 | Schrader et al. | 24/20 EE |
| 1,084,407 | 1/1914 | Deist | 24/20 EE |
| 1,173,998 | 2/1916 | Depew | 24/23 W |
| 1,176,181 | 3/1916 | Thomas | 24/20 TT |
| 1,278,779 | 9/1918 | Springer | 24/20 TT |
| 1,746,033 | 2/1930 | Farmer | 24/22 |
| 3,078,532 | 2/1963 | Bywater | 24/23 EE |
| 3,748,697 | 7/1973 | Marchese et al. | 24/20 TT |
| 3,964,133 | 6/1976 | Wasserlein, Jr. | 24/20 R |

FOREIGN PATENT DOCUMENTS

| 2428163 | 1/1980 | France . | |
| 2485425 | 12/1981 | France . | |
| 11627 | 4/1908 | United Kingdom | 24/23 W |

Primary Examiner—Victor N Sakran
Attorney, Agent, or Firm—Lewis H. Eslinger

[57] ABSTRACT

Clamp of the type constituted by a wound-over metal band, a first end of which is provided on its external face with an oblong patch of transversely extending scores or teeth, the width of said patch being preferably less than that of the band, whereas the second end is provided with a fastener joined to the band and wound over crosswise thereof on the outside of the band to provide a passage for the first end. The two ends of the fastener cover one another on the outside of the band and are assembled by a bent strip of metal of which the side facing the band is provided with scores or the like, extending crosswise to the band and designed to cooperate with the scores or teeth of the first end of the band.

3 Claims, 6 Drawing Figures

HOSE CLAMP

The present invention relates to clamps.

A number of clamps are already known, such as for example the clamps described in French Pat. No. 2 428 163, corresponding to U.S. Pat. No. 4,319,385, of the type constituted by a wound-over metal band, the two ends of which are provided with complementary fastening means, such as suitably directed teeth. But it has now been found with those systems, that the mutual engagement of the fastening means requires, besides a fastener to prevent the two ends of the band from coming accidentally apart, a very accurate design of the fastening means. For example, some of the teeth must have a sunk-in shape, the construction of which may create certain difficulties, in particular when the band exerts a strong pressure on the article to be clamped, this pulling strongly on the two ends of the clamp.

It is the object of the invention to propose a clamp of the aforesaid type, but which will be easier of construction and therefore cheaper to produce, in particular as far as the means used to fasten the two ends of the band are concerned. It is however to be noted that the fastening means described hereinafter can be used on many other types of clamps regardless of how the clamp fits on the article to be clamped.

The clamp according to the invention comprises a first end with, on its external face, an oblong patch of scores or teeth extending transversely, the width of said patch being preferably less than that of the band. A fastener is fitted on the second end of the band and is wound over crosswise on the outside of said band to create a passage for the first end of the band.

According to the invention, the two ends of the fastener cover one another on the outside of the band and are assembled by a bent strip of metal of which the side facing the band is provided with scores or the like, extending crosswise to the band and designed to cooperate with the scqres or teeth of the first end of the band.

The invention will be more readily understood on reading the following description with reference to the accompanying drawings in which.

Figure 1:
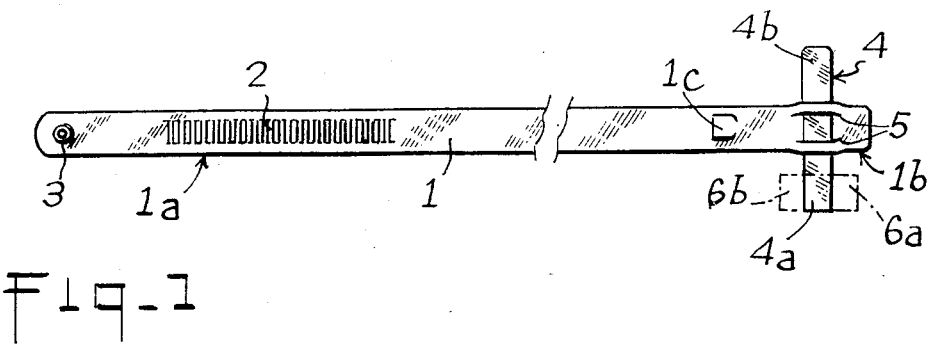
FIG. 1 is a plan view of a metal band intended to constitute a clamp according to the invention.

Referring to the drawings, these show that the clamp is constituted essentially by a metal band 1 of uniform width. Its first end 1a is provided with an oblong patch of transversal scores 2 obtained for example by stamping. Preferably, the length of said scores 2 is less than the width of the band 1, this preventing their deformation when a pulling force is exerted on the band. Said scores 2 are teeth-like, projecting on one side only of the band, which will be the outside of said clamp. This is the side which is illustrated in FIG. 1.

Preferably, the first end 1a further comprises a projection 3 which constitutes one of the gripping means of said end for tightening the clamp. The object and advantages of said gripping means are described in the aforecited French patent. It will however be noted that any other gripping means can be used under the present invention.

On the second end 1b of the band is fixed a fastener 4. Before being bent over, said fastener 4 is disposed, as illustrated in FIG. 1, perpendicularly to the band 1. Preferably, the fastener 4 passes through two slots 5 extending longitudinally in said band, but it could also be joined to said band by any suitable means, such as by welding. As illustrated in FIG. 1, and better still in FIG. 4, the middle part of the band between the slots 5 is held so as to extend from the surface of the band, whereas only the side edges are slightly raised to allow the fastener through. Thus, when the fastener is positioned, the inner face of the clamp remains uniform throughout its width.

It should also be indicated that a boss 1c is advantageously provided in the band, close to fastener 4, said boss being the second gripping means used for the clamping operation, as already described in the aforecited French patent.

Figure 2:
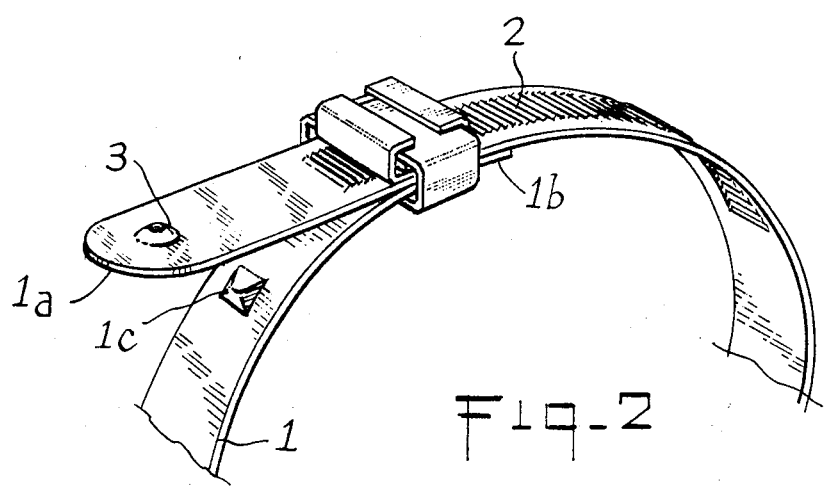
FIG. 2 is part of a perspective view of a clamp according to the invention ready to be used.
Figures 3, 4:
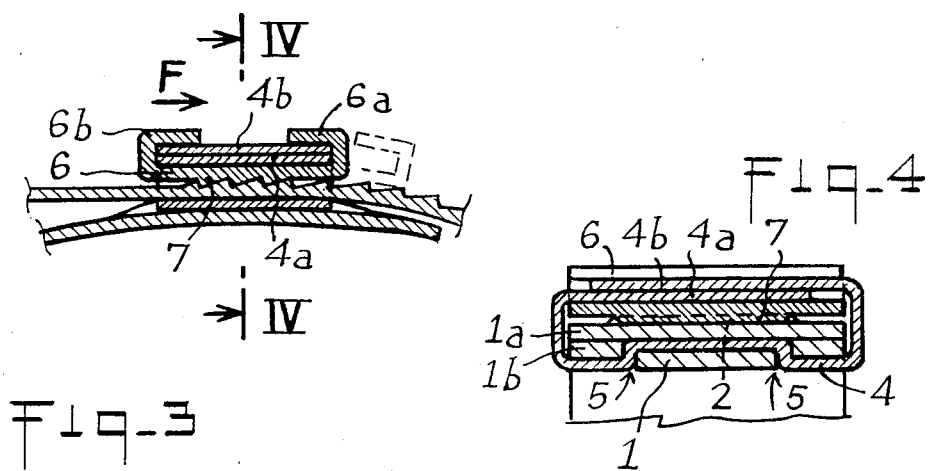
FIG. 3 is a view on a larger scale of a detail from FIG. 2, in the area where the means for fastening the two ends of the band cooperate.
FIG. 4 is a cross-section along line IV—IV of FIG. 3.

Band 1 is then wound over so that the beginning of the scored patch 2 reaches substantially over fastener 4 (FIGS. 2 and 3).

A small metal strip 6 is placed over the scored patch 2, its width being nearly that of the band 1, and preferably less. As shown in FIG. 3, the lower face of the strip 6 facing the patch 2 is provided with scores or teeth 7 which extend crosswise to the band 1. The length of these scores 7 is close to that of the scores of patch 2, and in particular their shape is complementary to that of the scores or teeth of patch 2. Preferably, as illustrated in FIG. 3, the inclination of the scores of patch 2 is less on the end side of the band and steeper on the other side, but equal if only small inclinations are just as suitable.

The two ends 4a and 4b of fastener 4 are thereafter wound around the two ends 1a and 1b of the band, thus imprisoning strip 6. These two ends 4a and 4b then cover one another on the outside of the clamp (FIG. 4). Finally, the fastener 4 is locked by bending the two ends 6a and 6b of the strip 6, thus making a ring which holds the two ends 4a and 4b, and is itself firmly joined to the fastener 4 (FIG. 3).

Figure 5:
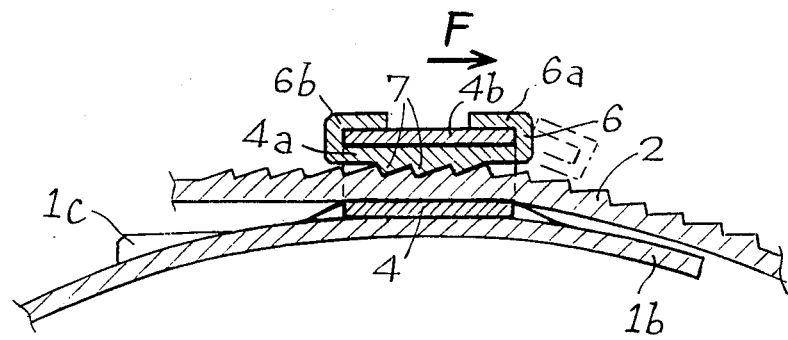
FIGS. 5 and 6 are similar views to FIGS. 3 and 4 of a variant embodiment.
Figure 6:
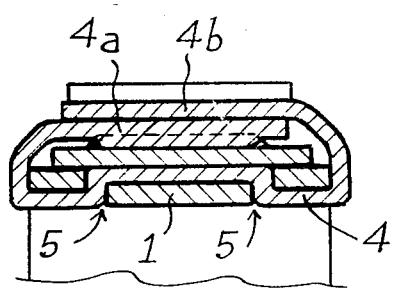

Referring now to FIGS. 5 and 6, these show a very advantageous variant of the ring holding the ends 4a and 4b of the fastener. There the ring forms part of the fastener 4 and more particularly of its end 4a. Its two ends 6a and 6b (shown in dotted line in FIG. 1) form lateral excrescences of said fastener 4 and can be cut from the metal sheet with the latter. The center of the fastener 4a situated between said two excrescences 6a and 6b receives the scores 7, for example by stamping.

The clamp is mounted in the same way as indicated hereinabove. The end 4b necessarily covers the end 4a and excrescences 6a and 6b of the latter are bent over the end 4b to constitute the ring holding the whole fastener assembly 4, said ring being, thereagain, firmly joined to the fastener 4 (FIG. 5).

All the operations described hereinabove can be automated for mass production of ready-for-use clamps.

Indeed, once the clamp is fitted around the object to be clamped, the end 1a is pulled whilst a pressure is applied on the end 1b. A tool such as described in French Pat. No. 2 485 425 can be used to this effect, said tool being designed to press on the two clamping means 1c and 3. But any other tool, whether a hand-tool or a machine-tool, can also be used as long as holding means are provided to cooperate therewith.

For example, a tool can advantageously be pressed on the ring 6 which is integral with the end 1b, whilst the necessary pulling force is applied on the end 1a, by means of the projection 3 or any other similar member. This manner of operating presents a further advantage which will be explained in more detail hereinafter.

In all cases when a pulling force is applied on the end 1a, said end moves inside the passage provided therefor by the fastener 4. The scores of patch 2 slide over the scores 7 in ring 6 until the operator decides that the clamp is closed tightly enough. This will be the case in the illustrated example when the projection 3 has been pulled off by the tool in the conditions set out in the aforecited patents.

After the tightening operation, the scores in patch 2 which cooperate with the scores in ring 6 integral with fastener 4, tend to pull the latter in the direction of arrow F (FIGS. 3 and 5). A slight deformation of fastener 4 then occurs which tends to engage the scores 7 more deeply into the patch of scores 2. (This is intensified for illustration purposes in dotted lines in FIGS. 3 and 5). The greater the pulling force in the direction of arrow F, the stronger the locking together of the two ends of the clamp.

It should be noted at this stage that if the tool used for tightening the clamp has to bear against the ring 6, it can, just in doing so, cause the deformation of the fastener 4, which helps the engagement of the scores 7 with the scores of patch 2.

Whatever the case, owing to the structure of the clamp according to the invention, and in particular to the slight deformability of its fastener 4 after tightening, the teeth or scores are no longer a critical element and their construction no longer demands the care that was required until now. In effect, it has now proved adequate that the part 2 and the ring 6 have complementary rugosities, capable of causing a stronger friction between the two ends 1a and 1b of the band immediately they are pressed one against the other by the deformation of fastener 4.

A number of other advantages should also be noted. Amongst them, the fact that, as can be seen in FIG. 2, the inside surface of the clamp is perfectly smooth, especially since the scored patch 2 is situated on the outside of the clamp. Thus, there is no risk now when the clamp is tightly closed, that the projections come into engagement with the soft material which may constitute the article to be clamped. The pulling force of the tool is thus used to obtain an even grip over the entire periphery of the article to be clamped.

Another advantage is that the projections constituting the teeth or scores of patch 2 or of ring 6 are not required to be very high, so that when the clamp is tightened, the efforts required from the tool used to pass the scores one over the other will be small. For example, it has been found that with a tool of given pulling capacity, it is possible to obtain an increase of about 40% of the pressure of the clamp over the article to be clamped.

What I claim is:

1. A clamp comprising a wound-over metal band, a first end of which is provided on its external face with an oblong patch of transversely extending scores or teeth, the width of said patch being preferably less than that of the band, and the second end of which is provided with a fastener joined to the band and wound over crosswise thereof on the outside of the band to provide a passage for the first end, the two ends of the fastener covering one another on the outside of the band and being assembled by a bent strip of metal of which the side facing the band is provided with scores or the like, extending crosswise to the band, and designed to cooperate with the scores or teeth of the first end of the band for tightening said clamp.

2. A clamp as claimed in claim 1, wherein said strip is integral with one of the ends of the fastener and the ends of said strip are constituted by two side excrescences between which are situated the scores of the strip.

3. A clamp comprising:
   a first element comprising a metal band having first and second ends, said first end having on an external face thereof an oblong patch of transversely extending scores, the width of said patch being less than the width of said band;
   a second element comprising a fastener located on said second end of said band and wound crosswise outside said band to provide a passage for said first end; and
   a third element comprising a bent strip of metal extending over said fastener and having a side facing said band with transversely extending scores formed thereon for cooperating with said scores on said first end of said band for tightening said clamp.

* * * * *